US010643240B2

(12) United States Patent
Burger

(10) Patent No.: US 10,643,240 B2
(45) Date of Patent: May 5, 2020

(54) SYSTEM AND METHOD FOR VIRAL MARKETING AND MANAGEMENT

(71) Applicant: Biglizard, LLC, Thousand Oaks, CA (US)

(72) Inventor: Paul H. Burger, Thousands Oaks, CA (US)

( * ) Notice: Subject to any disclaimer, the term of this patent is extended or adjusted under 35 U.S.C. 154(b) by 0 days.

(21) Appl. No.: 16/297,214

(22) Filed: Mar. 8, 2019

(65) Prior Publication Data

US 2019/0311403 A1  Oct. 10, 2019

Related U.S. Application Data

(63) Continuation of application No. 14/305,858, filed on Jun. 16, 2014, now Pat. No. 10,235,691.

(60) Provisional application No. 61/955,004, filed on Mar. 18, 2014.

(51) Int. Cl.
*G06Q 30/02* (2012.01)

(52) U.S. Cl.
CPC ..... *G06Q 30/0257* (2013.01); *G06Q 30/0269* (2013.01); *G06Q 30/0277* (2013.01)

(58) Field of Classification Search
CPC .................................................. G06Q 30/02
See application file for complete search history.

*Primary Examiner* — Marilyn G Macasiano
(74) *Attorney, Agent, or Firm* — Thomas A. Dougherty

(57) ABSTRACT

Systems, methods, and software for relatively low cost or free viral marketing management are provided. The system, method and software may be configured to receive primary user information from a primary user, wherein the primary user information may include log in information, a primary promotional code, and information related to an advertisement for the primary user, create a primary advertisement based at least in part on the received information related to the advertisement for the primary user, send the created primary advertisement, the primary promotional code, and information associated with a marketing management system to one or more prospective secondary users, receive, by the server, secondary user information from the secondary user, wherein the secondary user information may include log in information, the primary promotional code, information related to an advertisement for the primary user, present at least a portion of the primary advertisement to the secondary user, create a secondary promotional code, and secondary advertisement based at least in part on the received information related to the advertisement for the secondary user, wherein the secondary advertisement comprises at least a portion of the primary advertisement, and send the created secondary advertisement, primary or secondary promotional code, and information associated with a marketing management system to one or more subsequent users.

18 Claims, 12 Drawing Sheets

600

① 
② 
③ Ad arrangement

Ad Preview:

Premium Ad Details

610

Choose the style of ad you would like to display

620

○ IMAGE WITH TEXT   ○ TEXT ONLY

| Click here to choose or upload an image | (maximum dimensions: 125 px width x 104 px height)<br>*We will automatically resize your image to fit |

AD HEADLINE
Characters left: 28

630

Ad Preview:

DISPLAY URL
Characters left: 35

AD TEXT
(Blank lines ignored. Characters left: 95)

DESTINATION URL
http:

○ ENABLE THIS AD

Save changes and continue

Deselect All    Return to dashboard

AD NAME  710

☐ TARGET DOWNLINE ONLY?  720

☐TARGET STATES:

☐ Check All

☐ TARGET WITHIN

MILES OF THIS

730

OR

☐TARGET ZIP CODES:
(Hold ctrl key to click on multiple zip codes when they appear in list)

Deselect all

☐TARGET ORGANIZATION TYPES:

740

Deselect all

FIG. 7

SYSTEM AND METHOD FOR VIRAL MARKETING AND MANAGEMENT

CROSS REFERENCE TO RELATED APPLICATIONS

This application is a Continuation Application of patent application Ser. No. 14/305,858, entitled "SYSTEM AND METHOD FOR VIRAL MARKETING AND MANAGEMENT," filed Jun. 16, 2014, which claims priority to, and benefit from, provisional patent application Ser. No. 61/955,004, entitled "CUSTOMER RELATIONSHIP MANAGEMENT SYSTEM WITH PROMOTIONAL CODE FOR PAIRING ADVERTISEMENTS OF MULTIPLE USERS TO FACILITATE VIRAL MARKETING", filed Mar. 18, 2014, which are all incorporated by reference for all purposes.

BACKGROUND

Current customer relationship management software may not increase the business of a merchant or user. It also may do very little other than keep the name of the user in front of customers and prospective customers. Users can include businesses, individuals, groups, chambers of commerce, religious organizations, little league coaches, etc. Furthermore, these one dimensional marketing management systems may be expensive and cumbersome.

Overview

Systems, methods and software for relatively low cost viral marketing management are provided. The system may be beneficial for small and other companies desiring a no or low cost marketing creation and management solution. The system may increase the likelihood that new users will subscribe to the existing user's email marketing list, thereby increasing an opt-in subscriber database of contacts.

Pre-created, no cost newsletters for certain industries allow users to get a viral advertising scheme up and running in minutes. Additional features such as online storage and image editing may be offered at no cost. Existing users can also offer the customer relationship management software to others, free of charge.

New users sign up for free internet based customer relationship management software. They create their own unique promotional code and add their advertisement graphic. They then offer the software to other potential new users, free of charge, providing their promotional code to do so. The promotional code may be delivered through various methods, such as email, QR code, link, etc. When subsequent new users sign up using an existing user's promotional code, the system creates a sponsor/user relationship between the new user (secondary) and the existing user (who is now the sponsor or primary user) through the promotional code and as a result the new user is displayed the sponsor's free or paid advertisement on various pages and emails throughout the system.

A user can block content such as a sponsor's free or paid ad or any ad that is displayed to them and by doing so, the sponsor's ad will be blocked from being displayed to any of the sponsor's downline users. Any advertisement (free or paid) displayed to a user can be blocked if it is in the same organization type as the user. A user can block all ads at levels 1 and 2, including new downline paid ads. A paid ad may not have a downline. A sponsor can block all ads in the same organizations type from appearing to his downline for levels one and 2. Free ads have a downline. Paid ads may or may not appear to downline users.

A primary user has the ability to create a paid ad that targets only the primary users' downline. In this case, the paid advertisement will appear to only (and all) of the sponsor's down line users. Any user can target specific organization types and specific geographic locations, such as state, zip code, distance from location, etc. through paid advertising. As each new user signs up via an existing user's promotional code the user/sponsor relationships created are not only those of the sponsor but also the sponsor of the sponsor (the 1st level), etc. up to four levels of sponsorship may exist. A free ad may be only targeted at a one particular state, or all states.

Except for the case where a sponsor user has chosen to create a paid ad specifically targeting their own downline users; a sponsor's free advertisement will appear 100% of the time up to 2 levels down the line and less than 100% of the time to levels 3 and 4 downline users. This free marketing component is a strong incentive for users to continue to offer their promo code with the goal of expanding their business. Revenue comes from enhanced paid advertisement options.

By using the system, a user can market to their contacts electronically with little, reduced, or no cost, effort, and management. All email content used or created can be scheduled ahead of time. Additionally, by creating a unique promotional code and an associated advertisement image, a merchant can increase their business virally. In some embodiments, users can create their own templates and add their content. The result can be printed and used in non-computer displays and/or hardcopy, which can include the QR code a new user may use to sign into the system.

The system, method, and software may be configured to receive primary user information from a primary user, wherein the primary user information may include log in information, a primary promotional code, and information related to an advertisement for the primary user, create a primary advertisement based at least in part on the received information related to the advertisement for the primary user, send the created primary advertisement, the primary promotional code, and information associated with a marketing management system to one or more secondary users, receive, by the server, secondary user information from the secondary user, wherein the secondary user information may include log in information, the primary promotional code, information related to an advertisement for the primary user, create a secondary promotional code, and secondary advertisement based at least in part on the received information related to the advertisement for the secondary user, wherein the secondary advertisement comprises at least a portion of the primary advertisement, and send the created secondary advertisement, primary or secondary promotional code, and information associated with a marketing management system to one or more subsequent users, and presenting by the server the primary advertisement to the secondary user.

BRIEF DESCRIPTION OF THE DRAWINGS

FIG. 6 illustrates a user interface according to an example.

FIG. 7 illustrates a created advertisement, according to an example.

DESCRIPTION

This system provides a unique, viral email marketing solution for free to registered users of the system. As part of the sign up process to create a free account on the system, a new user can create their own unique promo code. This promo code generates a unique signup invitation page url and a QR code image with the unique signup invitation page url embedded in it. This unique signup invitation page url can then be distributed by the user in any manner the user sees fit in order to refer people to sign up for a free system account thus becoming a downline user for the referring user and optionally a new list subscriber for the referrer (at the discretion of the referrer and the referee). Some of the unique signup invitation page url distribution methods a user might employ include: posting the unique signup page url to their social media account(s), handing out flyers or business cards (and including their QR Code image), or through traditional advertising means such as newspaper, radio, and TV ads.

The system also provides an automated mechanism for referring new users by embedding a discreet system logo with a link to the user's signup invitation page url into each email that the user sends through the system's email marketing system.

When a prospective user visits a unique invitation page url the visitor is displayed the system's standard signup form with any optional signup invitation page information that the referring user may have configured, this could include an image and/or text as well as an option to join the referring user's mailing list and provides a mechanism for the referring user to expose themselves to the visitor even before the visitor has signed up.

A temporary cookie can be stored on the prospective user's device so that if the prospective user completes the sign up form, the information submitted will automatically include the referring user's promo code; permanently linking the new user to the downline of the referring user. If the new user chose the option to join the referring user's mailing list then the new user is automatically subscribed to the referring user's list as configured by the referring user.

Figure 1:
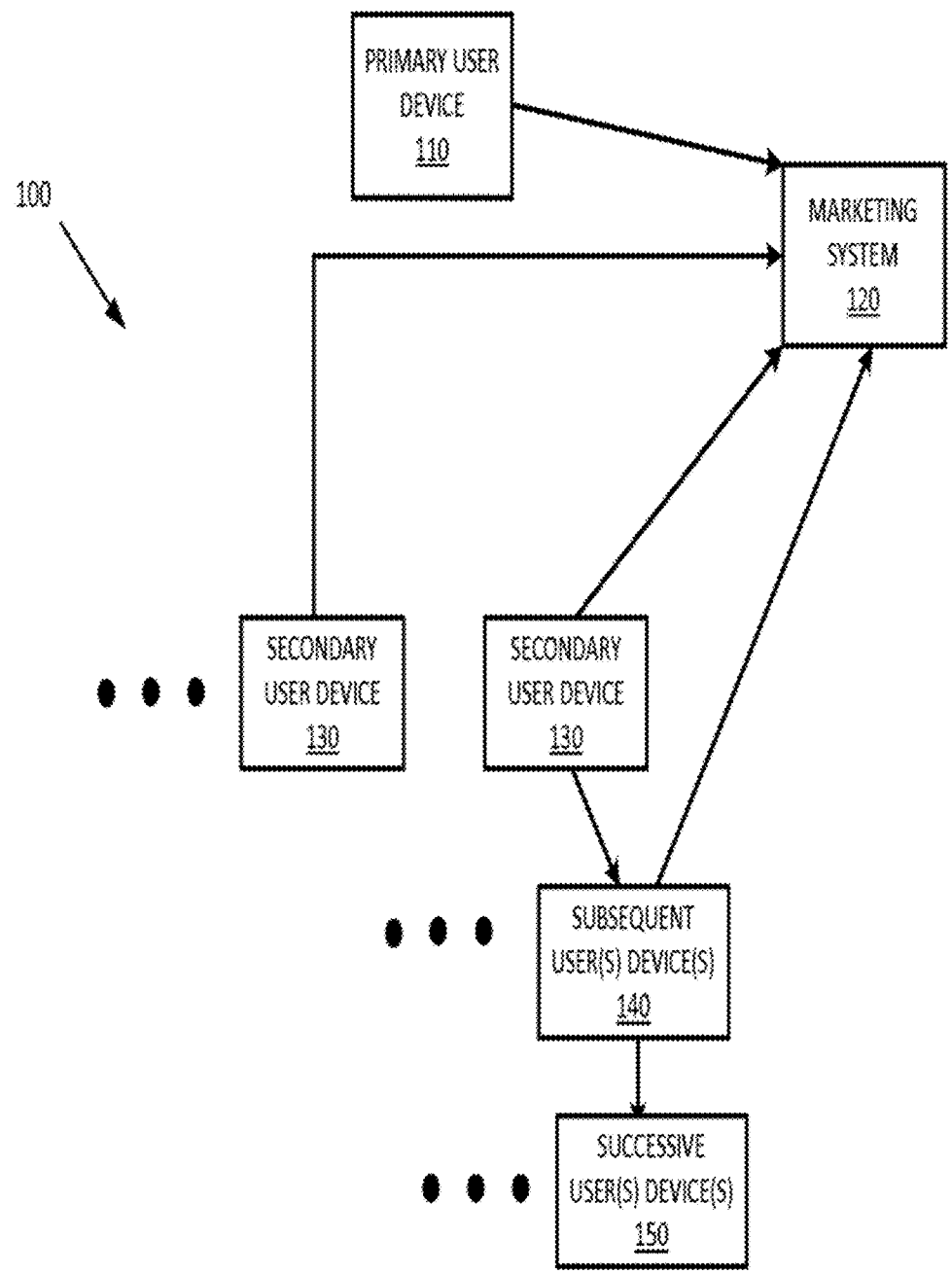
FIG. 1 illustrates a marketing system environment according to an example.

Systems, methods, and software are provided herein for marketing creation, management, and viral marketing. FIG. 1 illustrates a marketing environment 100 according to one example. System 100 includes systems primary user and associated device 110, secondary users and devices 130, subsequent users and devices 140, and marketing system 120. In FIG. 1, devices 110, 130, 140 receive and present information to and from users, then transmit/receive this information to marketing system 140 through one or more communication networks.

Devices 110, 130, 140 can include any device capable of carrying out some or all of the functionality described herein for various devices and computing devices. Devices 110, 130, 140 can include smart phones, tablets, laptops, computers, personal communication devices, etc. or any other device capable of receiving and presenting information.

The communication network can include the Internet or any other form of communication network between user devices 110, 130, 140 and server 120, and can include cloud-type programs and devices. Server 120 can include one or more server computers, desktop computers, or any other devices configured to receive information from devices 110, 130, 140, and be capable of accomplishing the some or all of the functionality described herein.

Marketing system 120 may include a server or other computing environment with software modules with functionality for creating, managing, sending marketing, as well as viral marketing. Users may sign up and enter information via devices 110, 130, 140 and use the system 120 to create and manage marketing as described herein. Server 120 may include software modules configured to carry out various functionality of the system, including the method described in FIG. 2, and other functionality or methods described herein.

As shown, many secondary user devices 130 may be used and/or included. Similarly, many subsequent users and devices may use the system 120. Successive users 150 and devices may also be included in the environment and may use the system 120.

Secondary users 130 may be at a marketing level 1, with respect to the primary user. Subsequent users 140 may be at marketing level 2 with respect to primary user 110. Successive users 150 may be at marketing level 3 with respect to primary user 110, and at marketing level 2 with respect to secondary users 130.

Different users may be at various levels with respect to other users depending on the promotional codes used, and promotional codes and advertisements sent to user at lower marketing levels. It is possible for a user to be a primary user, secondary user, subsequent user, etc. at the same time with respect to different users. Groups may be created with a single promo code, and market to each other.

Figure 2:
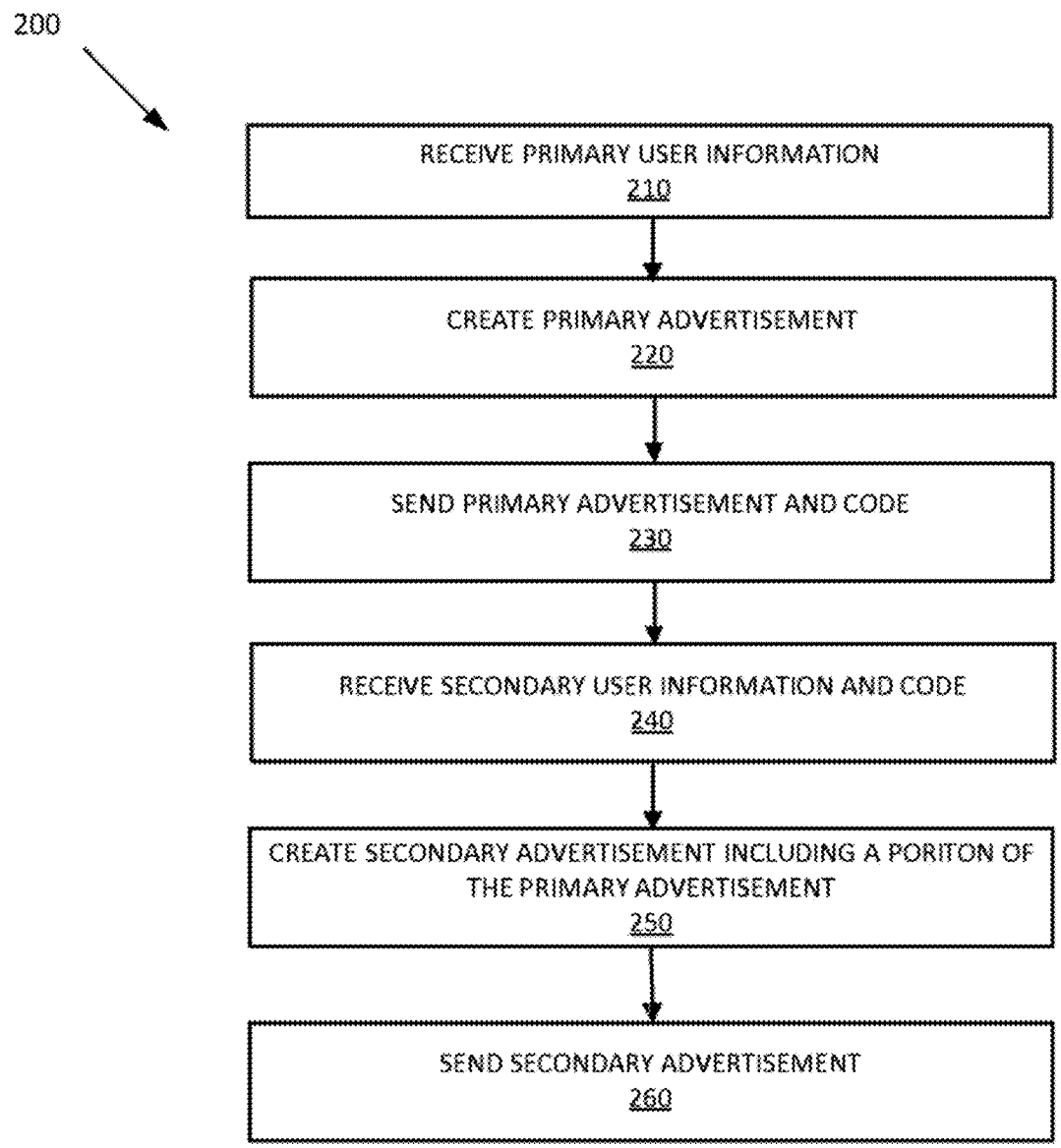
FIG. 2 illustrates method of the operation marketing system according to an example.

FIG. 2 is a flow diagram illustrating a method of operating marketing system 100 according to an example. Server 120 is capable of receiving primary user information from a primary user device 110 (step 210). Server 120 may also be capable of creating a primary advertisement based at least in part of the received primary user information (step 220). Marketing system 120 may the send the created primary advertisement and promotional code to marketing contacts or a marketing list (step 230). Marketing system 120 may receive secondary user information and the sent primary promotional code (step 240).

Next, marketing system 120 may create a secondary advertisement based at least in part on the received secondary user information, as well as including a portion or all of the primary advertisement (step 250). Then, marketing system 120 may send to secondary advertisement to the secondary user's contacts, and once the contact becomes a new user, the new user will be presented with this sponsor's ad (the secondary user) and the primary user's ad, as well as paid ads. In one example, if there are two paid ads, only 2 free ads will appear.

The primary user information may include log in information, a proposed promotional code, and geographic information. The primary user information may further include graphics, text, url, QR code, and/or other information the user may want to include in the primary advertisement. The created primary advertisement may include some or all of the primary user information, as well as other information. The primary advertisement may include a free ad, paid ad, hardcopy, etc.

The primary user may also upload or otherwise input a marketing contact list. The primary advertisement may be sent to the contacts in the list. Furthermore, the primary user may send other material, such as holiday greetings, newsletter, etc. at a later time.

The primary user may receive advertisements from other users, making the primary user a secondary, subsequent, or successive user. However, a user may not know any personally identifiable information about his downline users. The paid ad may be targeted to other users subject to the filters of the users. The paid ad may not have a downline user, but can.

THE DOWNLINE: Users who have joined the system via a signup invitation page url are a downline user to the owner of the signup invitation page url (i.e. the referrer). Specifically, the new user becomes a level 1 downline user of the user (level 0) who referred them. They also become a level 2 downline user to the user who referred the user who referred them and a level 3 downline user to the user who referred the user who referred them and this continues down to 4 levels.

The system may have the capability to enable users to market to their downline users and other users via free advertising, premium advertising, and/or list subscribers. Users may not know who their downline is. Newly created ads will update and appear when users access the system.

FREE ADVERTISING: Each user may create a single free advertisement that may be displayed to their downline users in strategic locations throughout the system website and in email communications sent directly from the system to its users. This free advertisement can include an ad headline, ad text, an optional ad image up to 125 pixels×104 pixels in size, and an option to add a link for the ad audience to subscribe to a list the user has configured on the system (aka a Quick Subscribe Link). An advertiser (user) also has several options for targeting the audience of their free ad. Free advertisement targeting options include:
  a. Level 1 downline users only.
  b. Users in a specific state or all states.
  c. Users who are within a specified mileage from the advertiser's location.

UPLINE FREE ADVERTISEMENT BLOCKING: In addition to ad targeting which allows a user to control the audience of their own advertisement, the system's advertising system gives some control to the user as to which free advertisements of those users who referred them may be displayed to their own downline users by allowing a user who is of the same organization type as the advertiser the ability to block each individual advertisement from being displayed to their own downline users.

PREMIUM OR PAID ADVERTISING: Anyone who wishes to advertise through the system may do so via premium advertising. A premium advertisement includes an ad headline, ad text, an optional ad image up to 125 pixels×104 pixels in size, and an option to add a link for the ad audience to subscribe to a list the user has configured on the system (aka a Quick Subscribe Link). Premium ads generally have a cost associated with them and this cost is set via an ad agreement negotiated by the system provider with the advertiser once a premium advertisement has been created and submitted. A premium advertiser also has several options for targeting the audience of their premium ad and these options are generally more attractive and flexible than the ad targeting provided with a free advertisement.

Premium advertisement targeting options include:
  a. Downline users only. (*See Exclusive Downline Option)
  b. Users within specified state(s).
  c. Users within a specified mileage from a given location.
  d. Users within specified zip codes.
  e. Users within specified organization types.

EXCLUSIVE DOWNLINE OPTION: When an advertiser chooses to target only their downline users through a premium advertisement some special rules may be applied in the serving of this ad.
  1. The exclusive downline premium ad takes precedence over the user's free ad.
  2. The exclusive downline premium ad takes precedence over all other ads.

This can be a useful advertising tool for a user because it provides them with an ability to override the serving of their free advertisement to a select group of downline users and an ability to override a premium advertisement intended for an audience of users who are not already in their downline.

PREMIUM ADVERTISEMENT BLOCKING: The system's advertising system gives some control to the user as to which premium advertisements may be displayed to their downline users by allowing the user to block premium advertisements from all advertisers who are of the same organization type as the user from appearing to their level 1 and 2 downline users.

LIST SUBSCRIBERS/CONTACTS: The list feature of the system is the most flexible and direct way for a user to market to an audience. A list allows a user to define the information that they would like to gather from a person who subscribes to their list and so a list could be as simple as an email address, first name and last name or as advanced as the requirement of a physical address or other additional information. Each list provides a user with all of the customizable forms, transactional email messages, and hosting required to maintain and grow a list of subscribers automatically as well as a full API and embedded forms options so that a user can host their own custom forms on their own website and integrate them easily with their list at the system.

A list subscriber's information are private, personal information that is stored securely on the system and owned by the user. A list's subscribers do not need to be a user of the system nor are they ever required to join the system.

Once a user has a list of subscribers the user can design, publish, save, schedule, and send an email campaign to the subscribers of their list. When those subscribers receive the user's own unique email marketing message from the email campaign, the system automatically includes links to unsubscribe, update subscriber profile, and the Granza logo and link with the user's signup invitation page url discreetly in the email message. This provides the user's subscribers with the ability to easily maintain their subscription preferences and provides them an opportunity to sign up for a free system account and become a downline user of the list owner thus automatically increasing the virality of the user's advertising efforts on the system, if those users use the system to market. A user may also configure their email campaign(s) to include links to provide additional opportunities to extend the reach of their email message such as: forward to a friend and share on social media. The system ensures that each email message sent through an email campaign contains all of the information required by the CAN-SPAM act of 2003.

ADVERTISEMENTS SERVING: The system's serving of advertisements comes from its own inventory of free and premium advertisements created by the system's users who fulfill the role of an advertiser. These advertisements are served up by the system's ad server. Each page view that displays ads contains an ad canvas. The ad canvas contains four ad spots and each ad spot may contain a single ad. Ad spot 1 may be considered the preferred ad spot based on its physical location on the page and each succeeding ad spot is considered to be in a less preferred location than the previous ad spot inside of the ad canvas. See FIG. 9. However, the ads may rotate position when the user refreshes the screen, etc.

In addition to the "Quick Subscribe", "Free Ad Blocking", and "Premium Ad Blocking" features that make the ad system unique, the system also employs unique logic to choose the advertisements served to a user and was designed to provide a balance of free ads and premium ads when ad inventory is high while optimizing the serving of either type of ad when ad inventory is skewed to one type of ad in addition to balancing the serving of free advertisements from ad inventory that achieves a level of "fairness" to each free advertiser based on their position in the upline of the user being served the advertisements. If there are at least 2 paid and 2 free ads.

Figure 10:
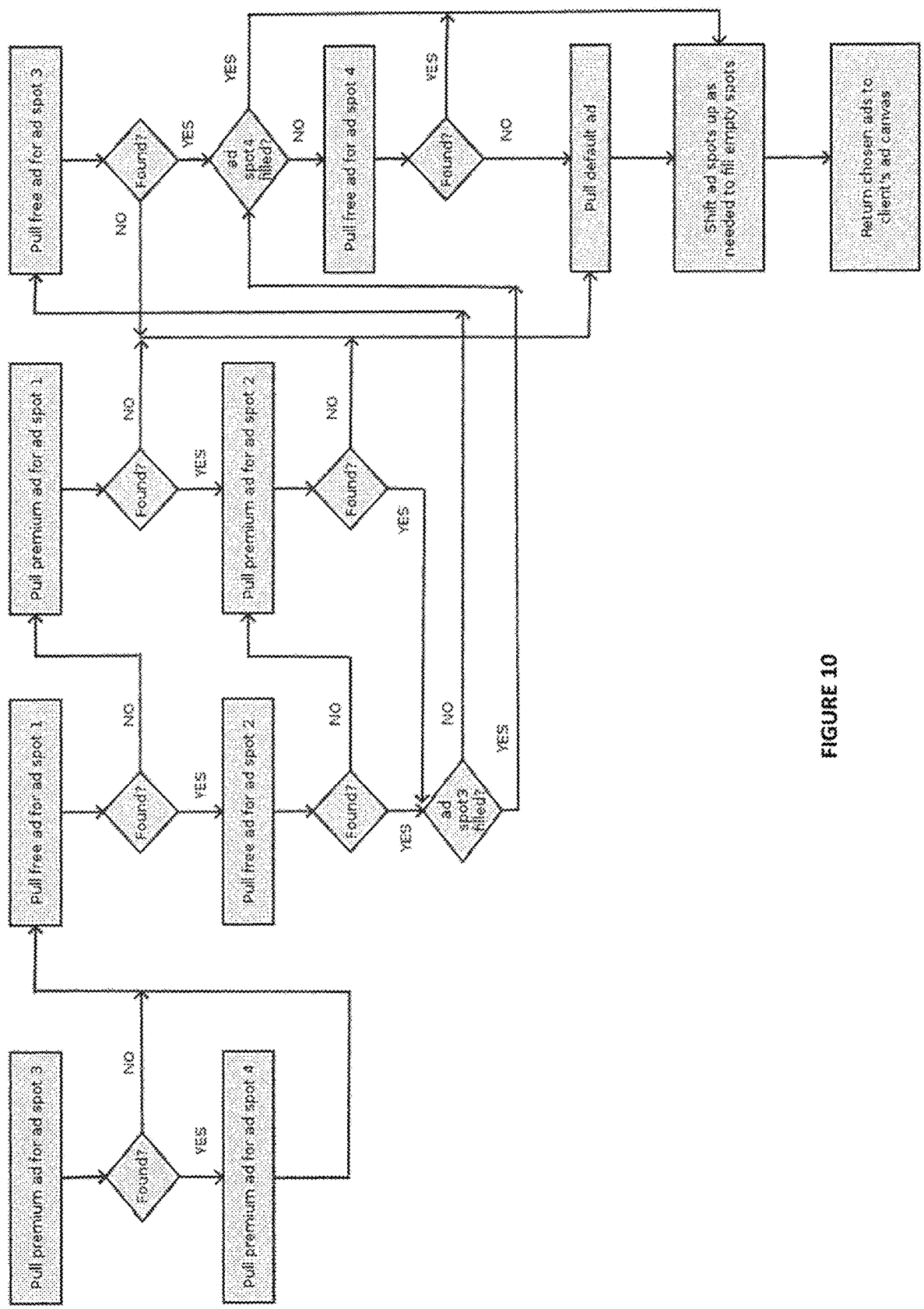
FIG. 10 illustrates a workflow for ad placement according to an example.

FIG. 10 shows the workflow for this logic, the process that the ad server utilizes to achieve these goals.

Figure 11:
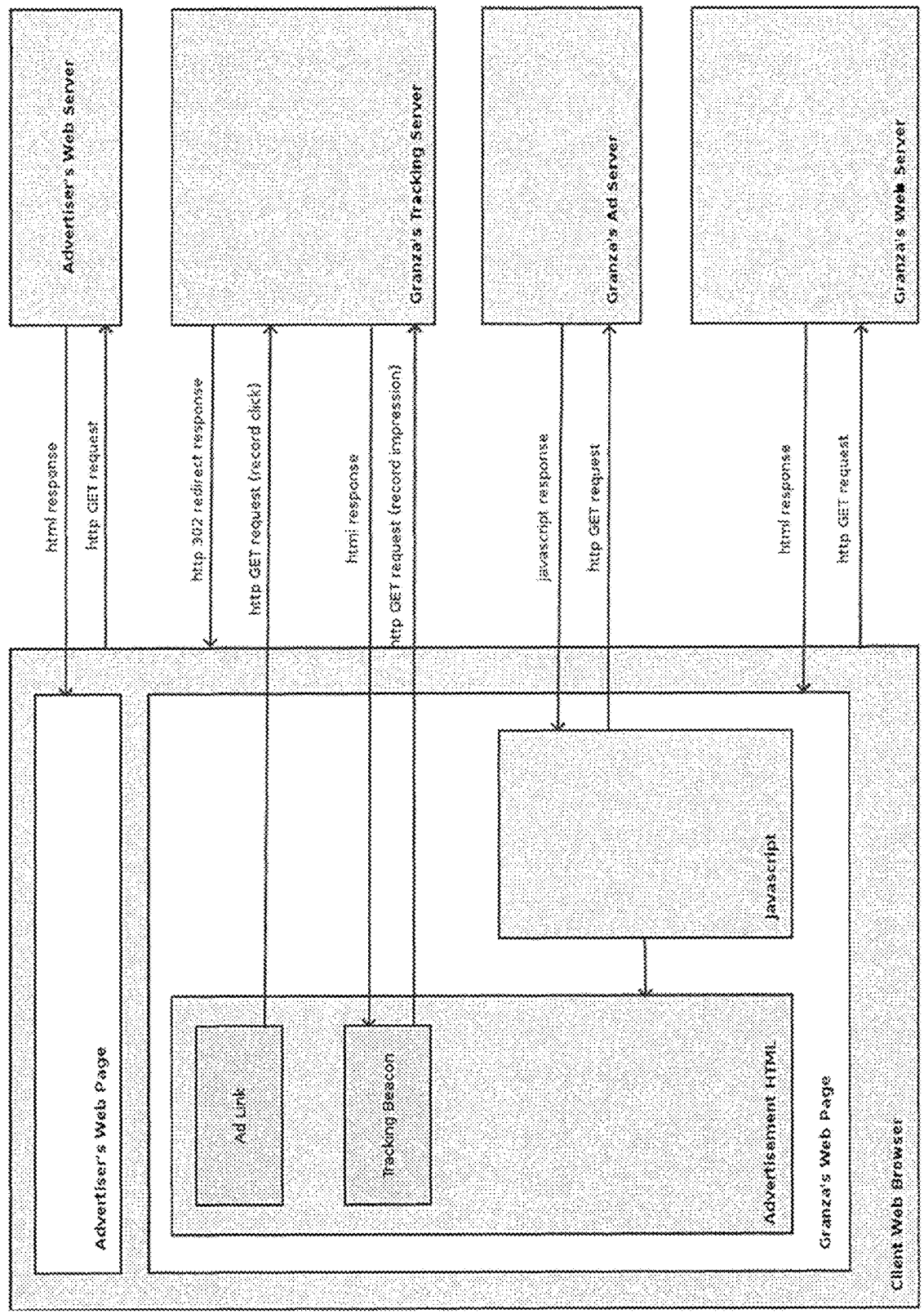
FIG. 11 illustrates a process for tracking ad activity according to an example.

An overview of the process of serving an advertisement, tracking the impression, click, and recording other metadata (user, ip address, time of impression, time of click, which ad spot the ad was in, etc.) on a web page is shown in FIG. 11.

One way to accomplish this may be by the advertisements can be chosen and returned to the prospective users' browser with a reasonable assumption they will immediately see those advertisements. If it is attempted to apply this same process to sending an email message you immediately run into a road block. Email clients do not typically support java script and therefore client-side java scripting may not be utilized to facilitate an http GET request to the ad server to display a selection of ads at the moment the email message is being viewed.

One way to overcome this problem is to embed the advertisements into the email message itself at the time you send the email message. This may work in that if the recipient of the email message reads that email message they will in fact see the advertisement, the web-beacon would record the impression, and any click would be recorded.

Embedding the advertisements into the email message at the time the email message is sent creates other problems to overcome:

Stale ads: There is no guarantee as to if or when an email message that is sent will ever be read. An embedded ad may no longer exist or be relevant (i.e. an ad for a 1 day sale scheduled for the day after the email is sent is of little use if read the day or week after that sale).

Over serving/underserving ads: A common method of charging advertisers for an advertisement is known as CPM or cost-per-thousand (impressions). If, as an ad provider, you have an advertiser with a $10.00 budget and you are charging the advertiser $1.00 CPM this means the advertiser will pay for the advertisement to be viewed 10,000 times in order to meet their budget. As the ad provider, by embedding the advertisement in the email message at the time it is sent there is no mechanism for knowing how many times the ad will be viewed until after the ad has already been sent. If the email message is sent to 20,000 recipients and there is a 100% read-rate then the advertisement has been over served by 10,000 impressions leaving the ad provider unable to charge for these additional impressions.

Conversely, if the read-rate is 20% then the advertisement has been underserved by 6,000 impressions. Underserving advertisements is good for neither the ad provider nor the advertiser—the ad provider is not able to get rid of ad inventory in a timely manner thus not meeting the expectations of the advertiser.

Figure 12:
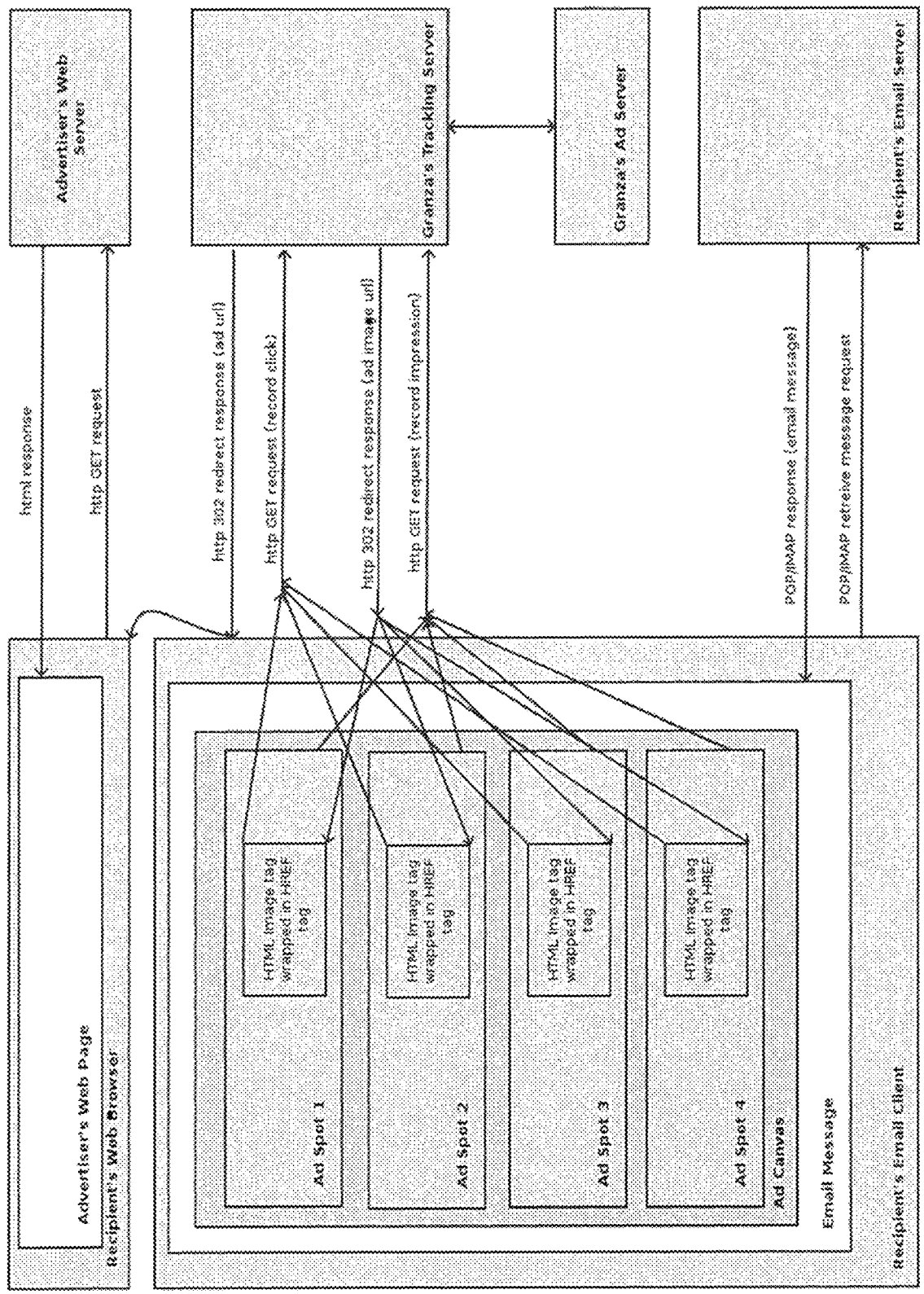
FIG. 12 illustrates a process for serving advertisements according to an example.

The system's ad system solves these problems in a unique way which allows for advertisements to be served by its ad server in an email message in real-time each time the email message is viewed by the recipient without the use of client-side java scripting yet maintaining the ability to quantify all of the tracking and meta-data of a traditional web page advertisement. By serving advertisements in an email message in real-time there is no longer a problem with stale advertisements or a risk of over serving/underserving advertisements due to budget constraints on a CPM based ad campaign thus enabling an efficient method of using up ad inventory without going over the advertiser's budget. FIG. 12 shows an overview of how the system achieves all of this. Each advertisement submitted to the system is processed so that an "image only" version of the advertisement is generated regardless if the advertisement contains only text or an image and text.

The image that is produced is an exact replica of the entire advertisement including any ad headline, ad display url, ad image, and ad text all encapsulated into a single image that can be viewed by any email client. When an email message is generated and sent to a recipient that should include advertisements the ad canvas is sent in the message ad contains a modified version of each ad spot that contains all of the meta data required to fill that ad spot with the image only version of each advertisement to be served.

When an email client encounters an ad spot inside of an email message it is treated as any other image tag would be treated: the email client makes a request to fetch the image specified by the source attribute of the image tag in the ad spot's html. This image source is a uniquely signed url that is received by the tracking server. The tracking server first validates that all of the meta-data contained in the query string of the image url is authentic by validating the signature of the url which, itself is also contained in the query string.

Once the signature has been validated this proves that all of the meta-data contained in the URL has not been altered since it was generated by the web server and thus the image only request for an advertisement is authentic.

At this stage the tracking server determines if it already has the advertisements to serve this request or if it needs to request the advertisements from the ad server. Because each email contains all four ad spots, each ad spot will make a request for an ad image but the tracking server only needs to make a request to the ad server for the advertisements once for each set of these four ad spot get requests that it will receive.

Once the ad tracking server has received the ads from the ad server it will remember which ad belongs to which spot it then records the impression for the ad that the image get request represents and returns a 302 redirect to the image only version of the advertisement.

Each ad spot in an email also contains a special href tag around each modified image tag so that after the ad image displays in the email message if the user clicks on that ad image the source of the href sends a get request to the tracking server which again goes through the signature validation to authenticate the meta-data is valid before then recording the click for the ad (which it remembers because it knows which ad it served into which ad spot for the ad canvas of that email message). Example 3 shows an overview of the process of serving the ads from within an ad canvas in real-time through an email message that has been sent from the system email marketing system.

A prospective secondary user may receive the primary advertisement, including primary promo code and information about using the marketing system. The secondary user may use the marketing system and input secondary user information and the primary promo code.

The marketing system may receive the secondary user information and promo code. The secondary information includes log in information. The marketing system may then present or otherwise display that least a portion of the primary advertisement to a registered or logged in user. The marketing system may then also create a secondary advertisement. The secondary advertisement may include a portion of the primary advertisement as shown in FIG. 7. The portion of primary advertisement included may be a url, graphics, text, contact information, QR code etc. related to the primary user. In this manner, viral marketing is created.

Users who have signed in may receive advertisements of other users, unless the advertisements are blocked. Users may see advertisements within emails and other communications from the system. A user may also see the advertisements on the various webpages, dashboards, statistics pages, etc., the user sees after logging in to the system. Contacts and list subscribers will not see the upline advertisements, unless they become users.

In this manner the primary user may greatly expand the number of users who see the a portion of the primary advertisement, thereby creating a viral marketing program and system.

This may continue from user to user and greatly expand the users marketed to by the primary user. This may incentivize all users to use the system to expand marketing.

This customer relationship management system invites potential users to sign up for free internet-based marketing. Users may create their own unique promotional code and add an advertisement graphic. Use of the system may subsequently be offered to other potential new users, free of charge, by current users providing their promotional code or by potential new user engagement of QR codes or links.

Subsequent users are thereby associated with previously established users at hierarchal levels below the previously established users. Users of lower hierarchal level see advertisements of the users of higher hierarchal level in various places on the system. They may also see outside paid ads. In this way users of level one through four will view advertisements of the sponsor (level 0) through three, respectively, unless there are paid ads.

Figure 3:
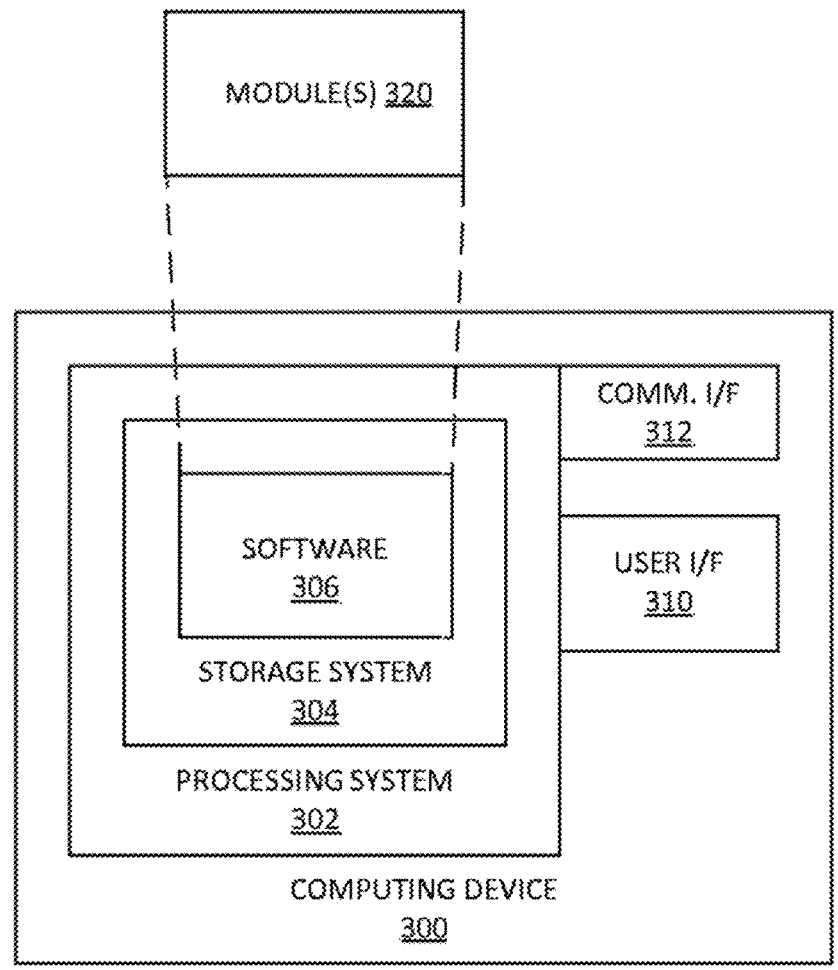
FIG. 3 illustrates a marketing system according to an example.

FIG. 3 is a computing device 300 according to an example. Computing device 300 include one or more software module(s) 320. Software module 320 may be capable of directing computing device 300 to operate with the functionality of FIG. 2 and functionality described within this disclosure.

Computing device 300 comprises devices capable of transmitting and receiving information such as a server, a personal computer, a smartphone, a cell phone, a telephone without a GUI, and the like. Computing device 300 may also comprise devices capable of receiving and transmitting messages, and motion and location information such as GPS, smartphones, personal computers, and the like.

Computing device 300 includes processing system 302, storage system 304, software 306, user interface 310, and communication interface 312. Processing system 302 is linked to user interface 310 and communication interface 312. Software 306 and module 320 is stored on storage system 304. In operation, processing system 302 executes software 306 to operate as disclosed herein for a marketing system and/or server.

Communication interface 312 comprises a network card, network interface, port, or interface circuitry that allows computing device 300 to receive user information and other information. Communication interface 312 may also include a memory device, software, processing circuitry, or some other communication device. Communication interface 312 may use various well known protocols.

User interface 320 may include a speaker, microphone, buttons, lights, display screen, mouse keyboard, or some other user input/output apparatus—including combinations thereof Processing system 302 includes storage system 304. Processing system 302 retrieves and executes software 306 from storage system 304. In some examples, processing system 302 comprises specialized circuitry, and software 306 or storage system 304 could be included in the specialized circuitry to operate processing system 302 as described herein.

Storage system 304 could include a computer-readable medium such as a disk, tape, integrated circuit, server, or some other memory device, and also may be distributed among multiple memory devices. Software 306 may include an operating system, logs, utilities, drivers, networking software, module(s) 320, and other software typically loaded onto a computer system.

Software 306 could contain an application program, firmware, modules 320, or some other form of computer-readable processing instructions. When executed by processing system 302, software 302 and/or modules 320 directs processing system 302 to operate as described herein, such as receiving user information and creating promo codes and advertisements, and sending/presenting them, among other functionality.

Although one computing device is shown, it will be appreciated that any number of computing systems may be used, and the software and modules may be spread thought many computing systems. Furthermore, the functionality may also be on one or more computers. This disclosure should not be interpreted to be limited in this or any other manner.

Figure 4:
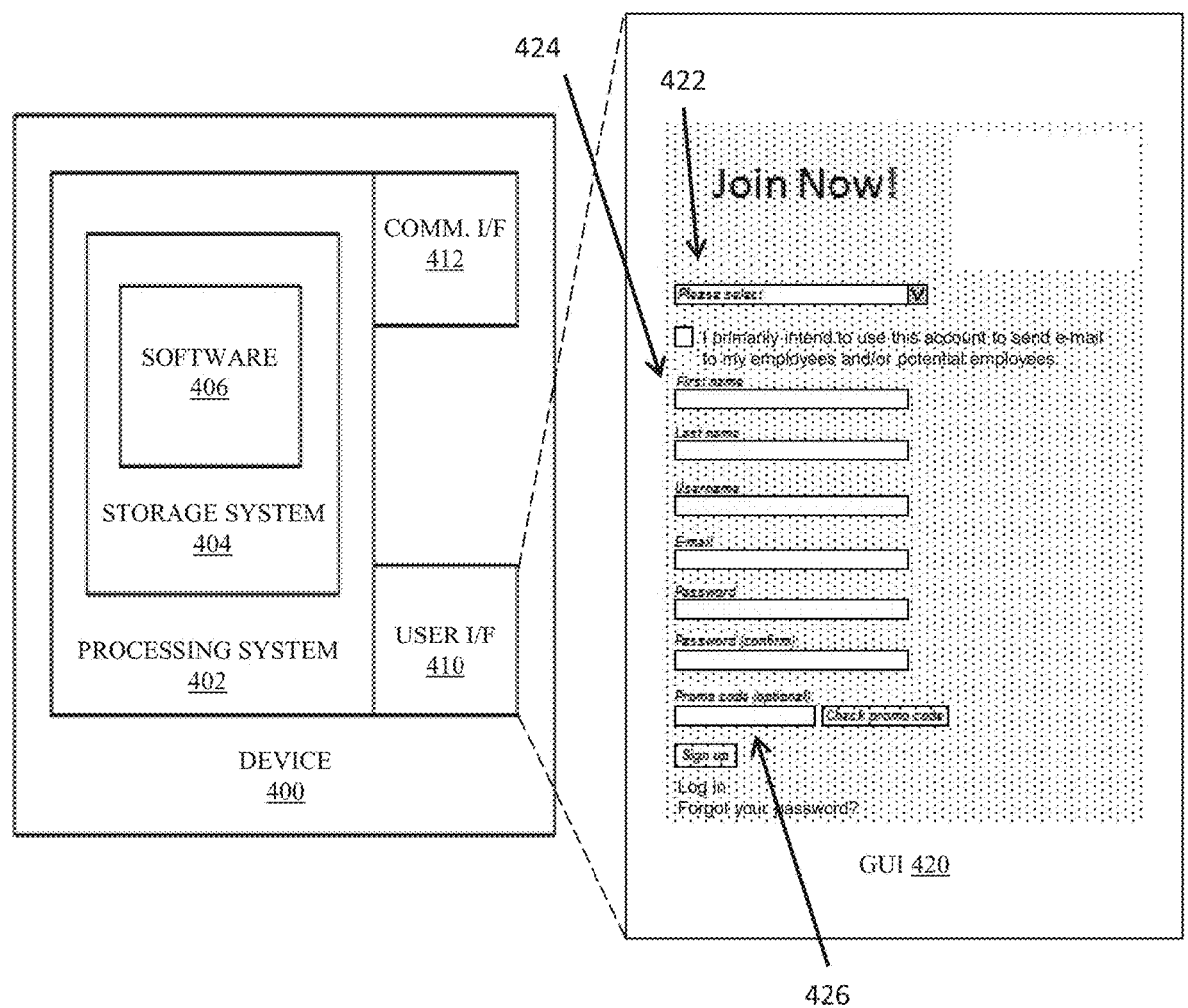
FIG. 4 illustrates a user interface and marketing system according to an example.

FIG. 4 illustrates communication/computing device 400. Communication/computing device 400 includes processing system 402, storage system 404, software 406, user interface 410, and communication interface 412.

FIG. 4 also illustrates graphical user interface (GUI) 420 displaying an interface for entering user information. GUI 420 can include a portion for entering of selecting an organization type 422, portion for entering other user information 424, and a portion for entering a promotional code 426.

User's may create their own unique promo code, which is then associated with that user. It may be distributed automatically and virally to gain contacts, expand business, and spread the marketing material. A user may also associate an image, text, URL, QR code, web address, etc., with their promo code. When another prospective user uses the promo code, they may be directed to the specified url or website to join as new user.

Organization type 422 may include lending, legal, accounting, engineering, retail, non-profits, etc., as well as many others. Using this organization type, users with the same or similar entity type will not receive advertisements for the same or similar organization type because these users will not likely need or want to see this type of advertisement. A user may choose this when they enter their information. His also would not be propagated to the user's contacts, so that the user's contact will not see competitor's competing advertisements.

User information portion 424 may include areas for the user to input user information relating to username, email, password, etc. Also the user may input the promo code in the promo code portion 426 the user received from a primary or other user. Every user selects or make up their own promo code, and the system then creates all of the associated links, such the QR code, a unique URL, etc. in the viral marketing system.

The user may also input location information which may be used for targeting advertisements to specific areas such as zip codes and states. This may be important because different states may have different rules, regulations, and laws regarding marketing of various services. The user may likely know of these rules, such as rules for marketing of lending services, etc.

In an implementation, device 400 may be an example of a user device 110 130 140, and may include a cell phone, personal computer, tablet, or any other device capable of receiving user information and transmitting it to the marketing system 120.

Computing device 400 includes processing system 402, storage system 404, software 406, user interface 410, and communication interface 412. Processing system 402 is linked to user interface 410 and communication interface 412. Software 406 is stored on storage system 404. In operation, processing system 402 executes software 406 to operate as disclosed herein for a user device.

Communication interface 412 comprises a network card, network interface, port, or interface circuitry that allows device 400 to receive user data and transmit it to a marketing system via networks, wired or wireless communication, etc. Communication interface 412 may also include a memory device, software, processing circuitry, or some other communication device. Communication interface 412 may use various well known protocols.

User interface 410 comprises components that interact with a user to receive user inputs and to present media and/or information. User interface 420 may include a speaker, microphone, buttons, lights, display screen, mouse keyboard, or some other user input/output apparatus—including combinations thereof. For instance, FIGS. 4-9 show examples of user interfaces various aspect of the marketing system viewable and operable via GUI 420.

Processing system 402 includes storage system 404. Processing system 402 retrieves and executes software 406 from storage system 404. In some examples, processing system 402 comprises specialized circuitry, and software 406 or storage system 404 could be included in the specialized circuitry to operate processing system 402 as described herein. Processing system 402 may be distributed among multiple devices.

Storage system 404 could include a computer-readable medium such as a disk, tape, integrated circuit, server, or some other memory device, and also may be distributed among multiple memory devices. Similarly, processing system 402 also may be distributed among multiple devices and locations.

Software 406 may include an operating system, logs, utilities, drivers, networking software, and other software typically loaded onto a computer system. Software 406 could contain an application program, firmware, or some other form of computer-readable processing instructions. When executed by processing system 402, software 406 directs processing system 402 to operate as described herein, such as presenting and receiving user inputs and displaying advertisements, statistics, etc.

Figure 5:
FIG. 5 illustrates a dashboard user interface according to an example.

FIG. 5 illustrates an example of a portion of a "dashboard" graphical user interface 500 according to an example. In portion 510, the user may create a promo code. Users may create many promo codes to distribute to various marketing lists. A user may want to do this to target various organization types, geographic areas, etc.

Block 520 of UI 500 includes may initiate another UI to allow the user to create a free or premium advertisement, similar to the UI shown in FIG. 6. UI 500 may also include a portion 530 to enable the functionality to create various marketing lists. Again the user may have many different marketing lists based on many factors including organizations type, location, user or target products, etc.

In addition, UI 500 includes a portion 540 to enable functionality for creating a marketing campaign. This may functionality where a user designs, authors, saves, schedules sends, of an actual email to their contact in the marketing list and/or subscribers.

UI 500 may also include upline advertisements (not shown), based at least in part on the user's organization type, and/or if the users indicated to not include these advertisements.

FIG. 6 illustrates a user interface 600 for creating a premium (paid) advertisement, according to an example. In this example, UI 600 may include a portion 610 for selecting whether the advertisement will include an image or graphic, or will be text only. UI 600 may also include a portion 620 for uploading or including an image or logo.

UI 600 may also include portions for enabling the user to enter a headline for the advertisement, a url of the user's website, text to be included in the advertisement, a destination URL, and a check box for enabling the advertisement to be used.

UI 600 may also include a preview portion 630 to show the user what the ad will look like, so that user may see how the changes will affect the final advertisement. It will be appreciated that other portions for enabling other functionality may be included, and this disclosure is not limited in this or any other way.

UI 600 may also include upline advertisements (not shown), based at least in part on the user's organization type, and/or if the users indicated to not include these advertisements.

FIG. 7 may illustrate a UI 700 for a paid advertisement, which may be used to target advertisement placement and delivery. UI 700 may include a portion 710 for naming the advertisement. Naming could help identify the target like "Colorado Lenders", or other name.

UI 700 may also include a portion 720 for selecting to target downline only, or targeting zip code 730 or targeting organization types 740. With this functionality, the system may be very configurable and may allow for very targeted viral advertising. This may reduce cost, money, and resources needed to create and manage marketing activities.

UI 700 may also include upline advertisements (not shown), based at least in part on the user's organization type, and/or if the users indicated to not include these advertisements.

Figure 8:
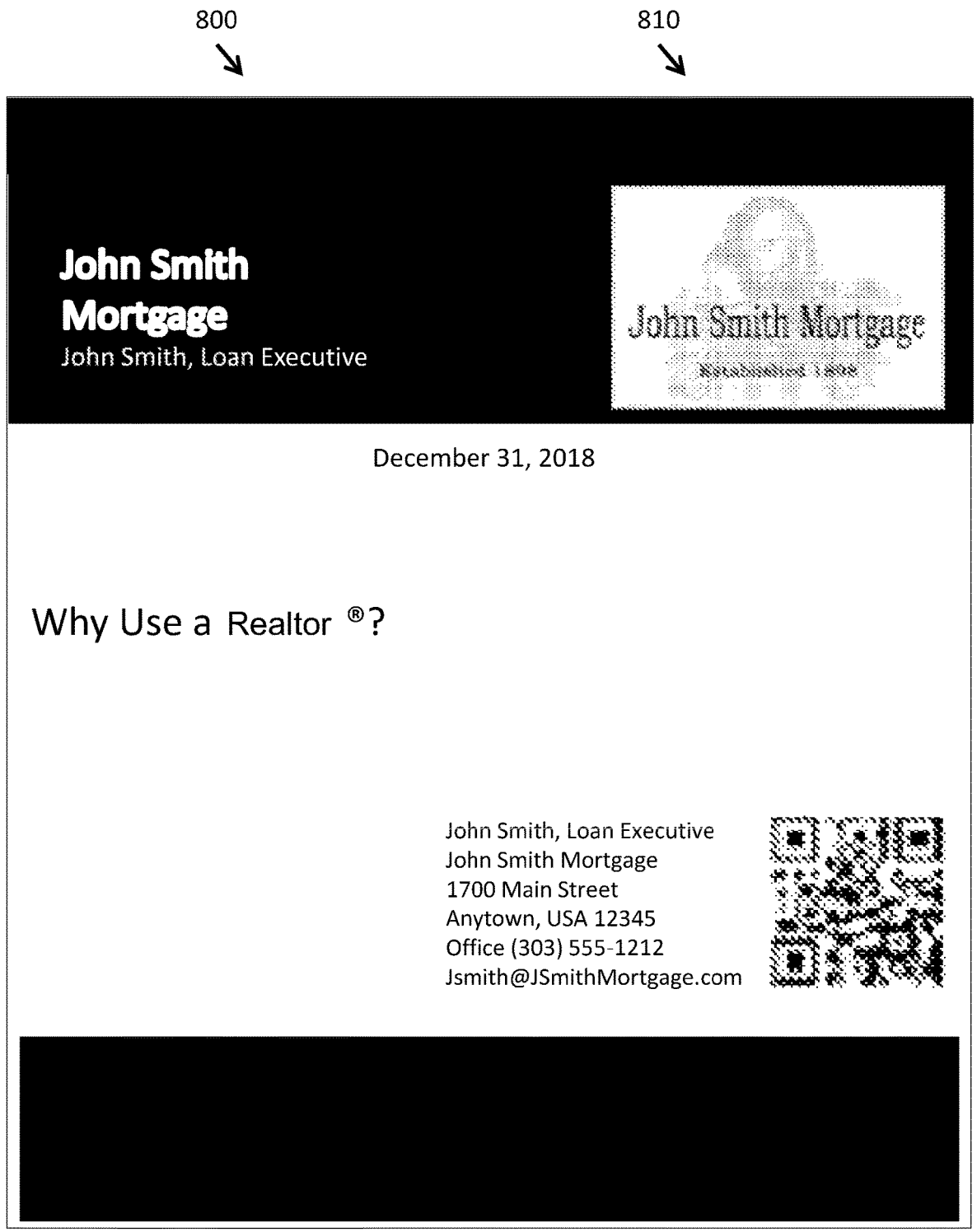
FIG. 8 illustrates a statistics user interface according to an example.

FIG. 8 illustrates an example advertisement 800 created by the user and system, according to an embodiment. Advertisement 800 may include the current user's advertisement 810. Ad 810 can include an image, headline, text, URL, contact information, address, a QR code, legal notices, etc.

The marketing system may include functionality for regular emails, emailed or printed newsletters and holiday greetings, among others. Each email sent from the marketing system contains links for the viral marketing components.

Each promo code link may contain the user's embedded information and the marketing system information. The information may be embedded in an image, text, QR code, etc.

This may be used as a printed advertisement, to be printed as a flyer for the user. Additionally, a portion (810) may be used to market to secondary, successive, and subsequent users when they receive communications from the system and on the various UIs when they log in to and use the system.

Figure 9:
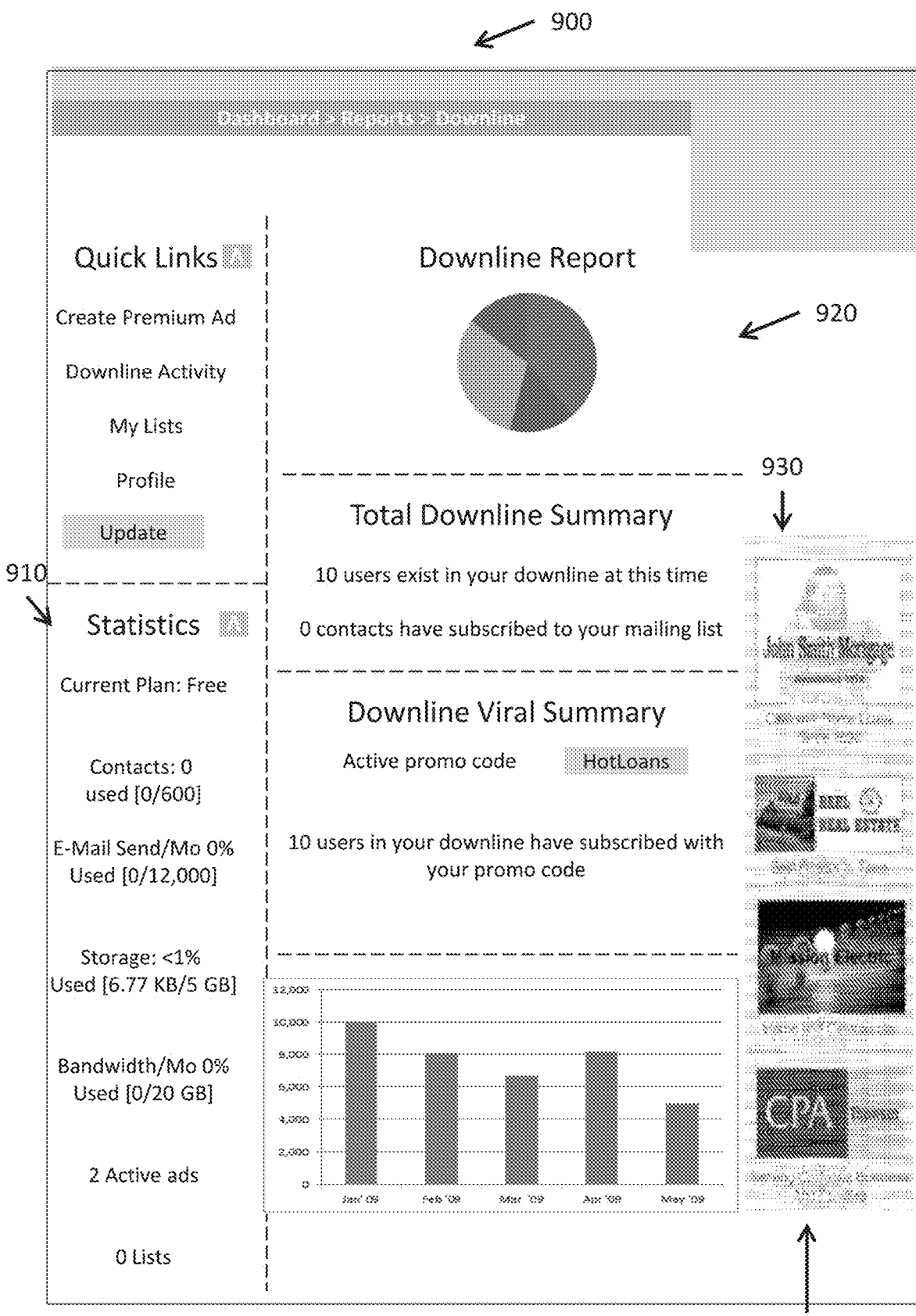
FIG. 9 illustrates a marketing flow control user interface according to an example.

FIG. 9 illustrates a user interface 900 showing marketing information, according to an example. UI 900 may include a statistics section 910 and a downline summary section 920.

As shown statistics section may include the current plan of the user, number of contacts, number of email sends per month, and amount of storage used. For a user who has requested or paid for additional functionality, there may be more resources (i.e. more contacts, more storage) available to be used. These statistics may be useful in managing the user's account. Other statistics may be included, and this disclosure should not be limited by the number and type of statistics shown here.

Section 920 may include information about the effectiveness and breadth of viewing and use of the user's advertisement and promo code. Section 920 may include information such as number of other users in the downline or tree of the current user. This may be an indication of how many other advertisements are including the current user's ad or information.

Section 920 may also include the number of users that have subscribed to the current user's mailing list. This may be an indication of how many people receive ads that are sent by the user.

Section 920 can include an indication of the current active promo code the statistics and information as associated with. The user may view a UI like this for every ad or promo code used.

Section 920 can include an indication of the number of other users who used this particular promo code to use the system. Section 920 may also indicate a number of other users and others who have subscribed to the mailing list for this promo code. These may be indications of the breadth and depth of the marketing associated with this promo code.

Section 920 may also include an indication of user and level using the promo code. The marketing level may be an indication of if the user using the promo code is a secondary, subsequent, successive, etc. user in relation to the current or primary user.

Dashboard 900 also includes one or more premium or paid ads 930 (John Smith Mortgage). John Smith Mortgage may be located in Ad Spot 1. Dashboard 900 may also include one or more primary/secondary/subsequent ads 940 (Reel Real Estate, etc.). Reel Real Estate may be located in ad spot 2, etc. Premium ads may appear at the top (ad spot 1, 2, etc.) or other area of the other advertisements area of UI 900. Next may appear free ads, such as a primary user's ad, then a secondary user's ad, etc. These may also rotate and appear at various locations. There may be only 4 total ads displayed in some examples.

All of the information in UI 900 may enhance the usage of the system and provide information to better manage and evaluate the marketing provided by the system.

Any of the UIs could be an application or web interface on a device 110 130 140 150 300 400, such a smart phone, tablet computer, laptop computer, desktop computer, other device with a user interface, or the like. All of the UIs may include advertising from users or others. These advertisements and links including the promo code, may be shared on various websites, including Facebook®, Twitter®, or any other form of social network, or other site. This may be used to get more users to sign up with the system.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

The invention claimed is:

1. A method of marketing management, comprising:
receiving, by a server, primary user information from a primary user, wherein the primary user information comprises a primary promotional code, and information related to an advertisement for the primary user;
creating a primary advertisement based at least in part on the received information related to the advertisement for the primary user;
sending the created primary advertisement, promotional code, and information associated with a marketing management system to one or more prospective secondary users,
wherein the primary promotional code further comprises geographic area if the primary user, and wherein a portion of the primary advertisement is not included in primary, subsequent, or successive advertisements based at least in part if a subsequent or successive user receiving the primary, subsequent, or successive advertisements has is outside the geographic area, or when indicated by the primary, subsequent, or successive user,
receiving, by the server, secondary user information from the prospective secondary user, wherein the secondary user information comprises the primary promotional code, secondary login information, and information related to an advertisement for the primary user;
presenting at least a portion of the primary advertisement to the secondary user:
creating a secondary advertisement based at least in part on the received information related to the advertisement for the secondary user, wherein the secondary advertisement comprises at least a portion of the primary advertisement; and
sending the created secondary advertisement, promotional code, and information associated with a marketing management system to one or more prospective subsequent users,
wherein the primary promotional code is used by the secondary user to access the marketing management system.

2. The method of claim 1, further comprising:
receiving, by the server, subsequent user information from the prospective subsequent user, wherein the subsequent user information comprises subsequent log in information, the primary or secondary promotional code, and information related to an advertisement for the subsequent user; and
presenting by the server, at least a portion of the primary advertisement, and a portion of the secondary advertisement to the subsequent user.

3. The method of claim 2, further comprising:
creating a subsequent promotional code, and subsequent advertisement based at least in part on the received information related to the advertisement for the subsequent user, wherein the subsequent advertisement comprises at least a portion of the primary or the secondary advertisement; and
sending the created subsequent advertisement, subsequent, primary or secondary promotional code, and information associated with a marketing management system to one or more successive users.

4. The method of claim 3, wherein the primary user information further comprises targeted marketing information which comprises at least one of organization type, marketing level, location, and the zip code information.

5. The method of claim 4, wherein the marketing level comprises degrees of separation between the primary user and a subsequent or successive user.

6. The method of claim 3, further comprising compiling and presenting statistics regarding the sent primary advertisement, wherein the statistics comprise at least one of number of advertisements sent, number of advertisements, number of marketing contacts, number of times the primary promotional code was used, and number of subsequent and successive users who used the primary promotional code.

7. The method of claim 3, wherein the creating the primary, subsequent, or successive advertisement comprises creating an advertisement configured to be printed.

8. The method of claim 3, wherein the creating the primary, subsequent, or successive advertisement comprises creating an advertisement configured to be displayed.

9. The method of claim 1, sending the created primary advertisement, promotional code, and information associated with a marketing management system to one or more prospective secondary users comprises sending using at least one of email, text, QR code, and social media.

10. A non-transitory computer implemented program product stored on a computer readable medium, which if executed by a processor, cause the processor to:
receive, by a specifically configured server, primary user information from a primary user, wherein the primary user information comprises a primary promotional code, and information related to an advertisement for the primary user;
create a primary advertisement based at least in part on the received information related to the advertisement for the primary user;
wherein the primary promotional code further comprises target area for the primary advertisement, and wherein a portion of the primary advertisement is not included in primary, subsequent, or successive advertisements based at least in part if a subsequent or successive user receiving the primary, subsequent, or successive advertisements has is outside the target area, or when indicated by the primary, subsequent, or successive user,
send the created primary advertisement, the primary promotional code, and information associated with a marketing management system to one or more prospective secondary users;
receive, by the server, secondary user information from the secondary user, wherein the secondary user information comprises secondary log in information, the primary promotional code, and information related to an advertisement for the secondary user;
present, by the server, at least a portion of the primary advertisement to the secondary user;
create a secondary promotional code, and a secondary advertisement based at least in part on the received information related to the advertisement for the secondary user, wherein the secondary advertisement comprises at least a portion of the primary advertisement; and
send the created secondary advertisement, primary or secondary promotional code, and information associated with a marketing management system to one or more subsequent users,
wherein the primary promotional code is used by the secondary user to access the marketing management system.

11. The computer implemented program product of claim 10, having further instructions to:
receive, by the server, subsequent user information from a subsequent user, wherein the subsequent user information comprises log in information, the primary or secondary promotional code, and information related to an advertisement for the subsequent user;
present at least a portion of the secondary or the primary advertisement to the subsequent user based at least in part on the primary or secondary promotional code;
create a subsequent promotional code, and subsequent advertisement based at least in part on the received information related to the advertisement for the subsequent user, wherein the subsequent advertisement comprises at least a portion of the primary or the secondary advertisement; and
send the created subsequent advertisement, subsequent, primary or secondary promotional code, and information associated with a marketing management system to one or more successive users.

12. The computer implemented program product of claim 11, having further instructions wherein the primary user information further comprises organization type information, and wherein a portion of the primary advertisement is not included in primary, subsequent, or successive advertisements if a subsequent or successive user receiving the primary, subsequent, or successive advertisements is in a similar organization type.

13. The computer implemented program product of claim 12, having further instructions wherein the primary user information further comprises paid targeted marketing information comprising at least one of organization type, marketing level, and location.

14. The computer implemented program product of claim 10, having further instructions wherein the target area comprises a state within the United States, or a zip code.

15. A marketing system, comprising:
a specifically configured server configured to execute software modules stored on a storage device, the software modules comprising:
a receiving module configured to receive primary user information from a primary user associated with a primary user device, wherein the primary user information comprises a primary promotional code, and information related to an advertisement for the primary user;

a creating module configured to create a primary advertisement based at least in part on the received information related to the advertisement for the primary user;

a sending module configured to send the created primary advertisement, promotional code, and information associated with a marketing management system to one or more prospective secondary user devices associated with one or more secondary users, and wherein the receiving module is further configured to receive secondary user information from a secondary user device, wherein the secondary user information comprises secondary log in information, the primary promotional code, and information related to an advertisement for the secondary user;

a presenting module configured to present at least a portion of the primary advertisement to the secondary user;

wherein the creating module is configured to create a secondary promotional code and a secondary advertisement based at least in part on the received information related to the advertisement for the secondary user, wherein the secondary advertisement comprises at least a portion of the primary advertisement;

wherein the sending module is further configured to send the created secondary advertisement, promotional code, and information associated with a marketing management system to one or more prospective subsequent users wherein the secondary promotional code is used by a subsequent user to access the marketing management system.

16. The system of claim 15, wherein the primary user information further comprises an indication of if the primary advertisement should be distributed virally.

17. The system of claim 16, wherein the primary user information further comprises at least one of geographic area, marketing level, and the organization type information.

18. The system of claim 15, further comprising a statistics module configured to compile and present statistics regarding the sent primary advertisement, wherein the statistics comprise at least one of number of advertisements sent, number of advertisements, number of marketing contacts, number of times the primary promotional code was used, and number of subsequent and successive users who used the primary promotional code.

* * * * *